Aug. 5, 1958 C. V. SCIULLO 2,845,638
BLANK EJECTOR MEANS OPERATIVE TO FIRST
STRIP BLANK FROM PUNCH AND THEN EJECT
BLANK OUT OF DIE
Filed Jan. 14, 1955 4 Sheets-Sheet 2

INVENTOR
Charles V. Sciullo
BY Rockwell Saichton
ATTORNEYS

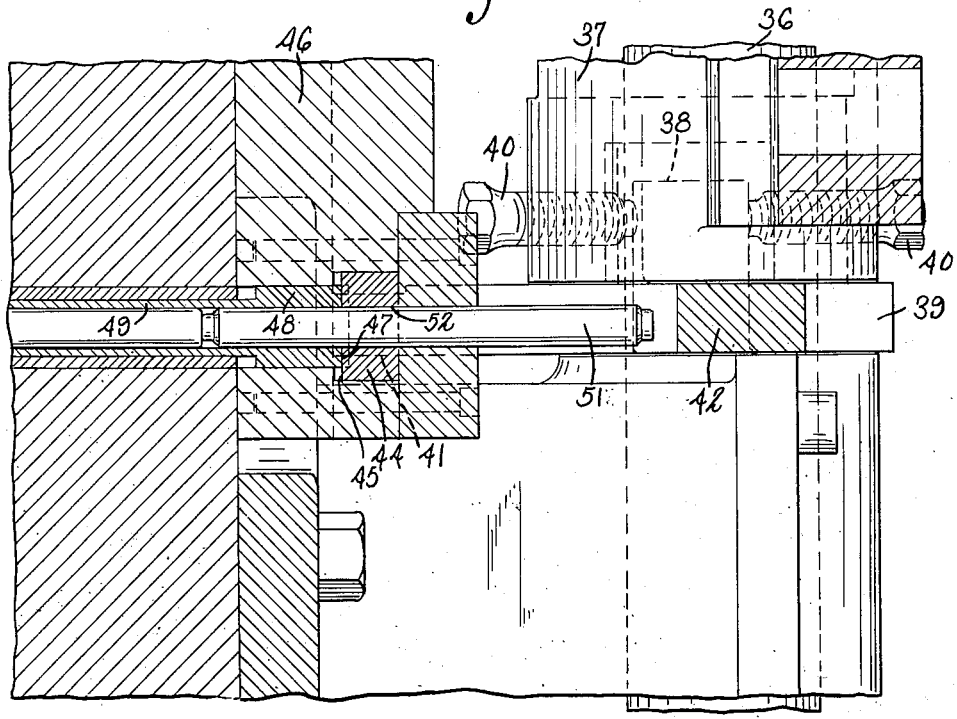
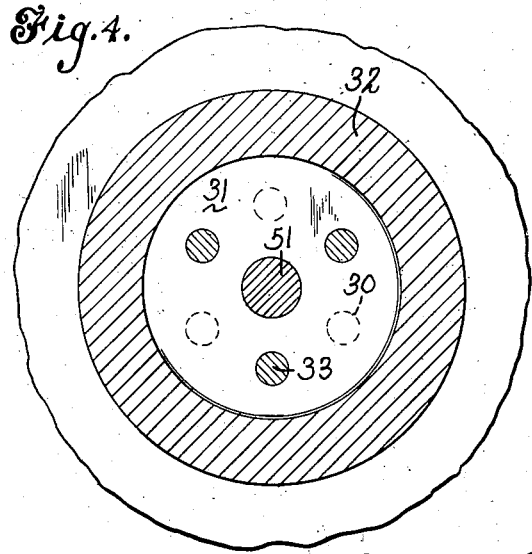

Aug. 5, 1958

C. V. SCIULLO 2,845,638

BLANK EJECTOR MEANS OPERATIVE TO FIRST
STRIP BLANK FROM PUNCH AND THEN EJECT
BLANK OUT OF DIE

Filed Jan. 14, 1955

INVENTOR

Charles V. Sciullo

BY Rockwell Backstow

ATTORNEYS

United States Patent Office 2,845,638
Patented Aug. 5, 1958

2,845,638

BLANK EJECTOR MEANS OPERATIVE TO FIRST STRIP BLANK FROM PUNCH AND THEN EJECT BLANK OUT OF DIE

Charles Vincent Sciullo, Waterbury, Conn., assignor to The Waterbury Farrel Foundry & Machine Company, Waterbury, Conn., a corporation of Connecticut Application January 14, 1955, Serial No. 481,773

11 Claims. (Cl. 10—76)

This invention relates to a machine for forming nut blanks, and more particularly to mechanism for ejecting a nut blank from a die after it has been formed in the machine.

In some instances in the formation of metal articles such nut blanks, it requires an extreme effort or force to eject the blank from the die of the machine in which it is formed. This is particularly true when the blank is formed over a forming pin or punch within the die, and particularly where this pin is provided with an exterior surface of such a nature that there is a strong bond between the pin and the blank.

In other words, where the blank is formed in an opening in a die and around the central pin extending into the die opening, the blank will be bound to some extent to both the die and the pin. In some instances, particularly where the exterior surface of the pin is of irregular shape, the blank will cling so firmly to the pin that it requires considerable effort to break this bound relationship. This is particularly true of forming nut blanks having, for example, a tapered bore with a key extending laterally from the wall of the bore into the interior thereof.

The present invention relates to means for ejecting the blank from the die of such a machine, and particularly involves the provision of mechanism by which the ejection of the blank is accomplished in two steps. As illustrated, the bond between the blank and the forming pin will be broken by advancing the die and blank relatively to the pin, the blank remaining bound to the die during this part of the operation. Secondly, the blank is then moved relatively to the die in order to eject it from the die. It will be seen that when these steps are separately performed and the bond between the pin and blank is broken in one operation and the bond between the blank and the die broken in a separate operation, less force is required than would be necessary to perform the ejection in a single step.

This result is accomplished by providing a movable or sliding die within which the blank is formed around a fixed forming pin and positioning between this forming pin and the opening in the die a knock-out sleeve. At the end of the formng operation the die will be in its rearward position and will remain in this position at the retreat of the punch carried by the usual gate. In the ejecting operation after the work upon the blank has been completed, a knock-out lever is advanced to first move the die forwardly relatively to the forming pin to break the bound relationship between the blank and the pin but leaving the blank within the die opening as both blank and die move forwardly together. Thereafter continued movement of the same knock-out lever picks up the ejecting sleeve provided in the die and which surrounds the punch, and by movement of this sleeve which impinges at its outer end upon the blank, moves the blank relatively to the die and thus ejects it from the die.

One object of the present invention is to provide a new and improved means for ejecting a blank from the die of a blank-forming machine.

A still further object of the invention is the provision of new and improved means for ejecting a blank from the die of a die-forming machine wherein the blank is formed about a forming pin or punch within an opening in the die so that the bond between the blank and the pin needs to be broken as well as the bond between the blank and the die.

Still another object of the invention is to provide means for ejecting a blank from a die in a machine in which the blank is formed in the die opening about a central pin, which means will first break the bond between the blank and the pin and thereafter break the bond between the blank and the die and eject the blank from the die.

To these and other ends the invention consists in the novel features and combinations of parts to be hereinafter described and claimed.

In the accompanying drawings:

Fig. 3 is a sectional view on line 3—3 of Fig. 1;

Fig. 4 is a sectional view on line 4—4 of Fig. 1;

Fig. 8 is a sectional view of the rear portion of the knock-out mechanism, the parts being shown in position corresponding to that of the die and associated parts, as shown in Fig. 5.

Figure 1:
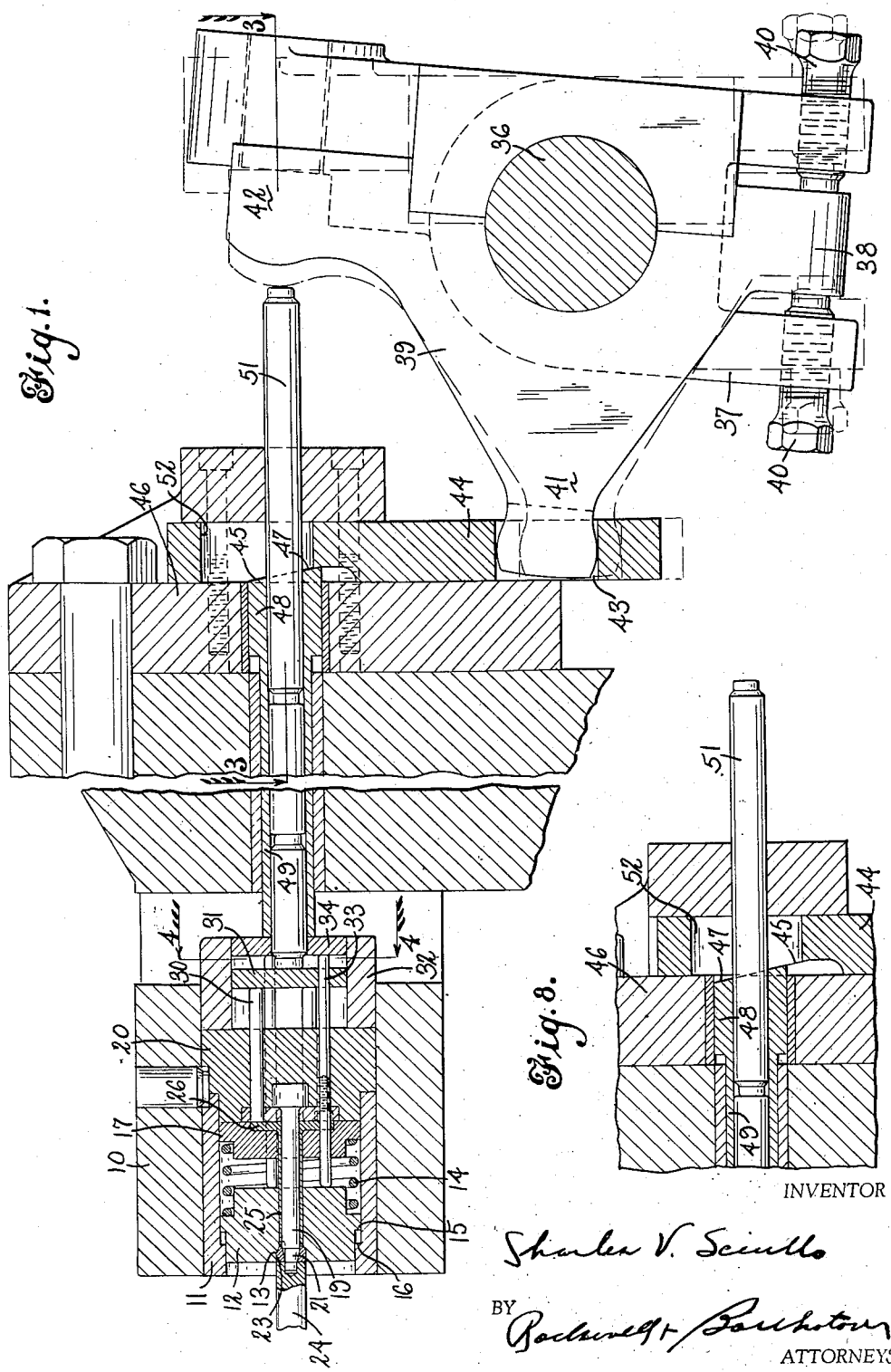
Fig. 1 is a sectional view of a blank-ejecting mechanism embodying my invention taken on line 1—1 of Fig. 2.

To illustrate a preferred embodiment of my invention I have shown in the drawings a portion of a forming machine comprising a die bed 10 having therein a die holder 11 (Fig. 1) within which is slidably mounted a die 12 having a die opening 13 extending therethrough.

The die 12 is normally urged in a forward direction by the spring 14 and its forward movement is limited by the engagement of the shoulder 15 provided on the die with a shoulder 16 provided on the die holder 11. The spring 14 at its rear end acts against a block 17 which is movably mounted in the die holder 11.

A forming pin or punch 19 is fixedly mounted within the die bed, this pin being secured in the block 20. As shown more especially in Fig. 7, the forward end of this pin is tapered as at 21 and is also provided with a keyway or recess 22 which is designed to form an inwardly extending key on the wall of the tapered bore of the blank 23.

Figure 7:
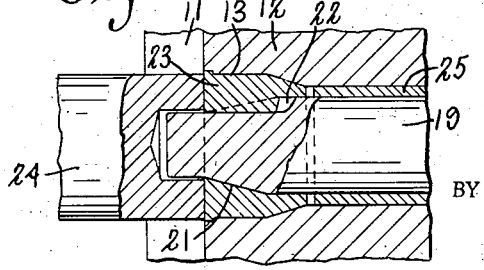
Fig. 7 is an enlarged sectional view showing the forming pin and the punch secured to the gate.

As also shown in Fig. 7, a punch 24 which is connected to the usual reciprocating gate (not shown) cooperates with the die tools to effect the blank-forming operation.

It will be noted that the forming pin 19 extends into the die opening and surrounding this pin is a knock-out sleeve 25 having a head 26 rearwardly of the block 17 so that this sleeve is movable in the die holder although the pin 19 is fixed.

Slidably mounted in the block 20 are three pins 30 which at their forward ends impinge against the head 26 of the sleeve 25 so as to move the latter forwardly when the pins are projected. The rear ends of these pins are in contact with the forward surface of the plate 31 which is movably mounted in a member 32 secured to the die bed.

Three pins 33 are also slidably mounted in the block 20, and the forward ends of these pins are in contact with the plate 34 also slidably mounted in the member 32. In order to actuate the plates 31 and 34 and the pins moved thereby, I have provided the mechanism shown more especially in Figs. 1, 2 and 3. A shaft 36 is rockably mounted in the frame of the machine and designed to be rocked by any of the usual cam mechanisms so that this member will be moved in time with the gate of the machine which carries the punches. Upon the shaft 36 is secured a U-shaped or clevis member 37 between the legs of which projects a lug 38 on a rocker member 39 loosely mounted upon the shaft 36. Adjusting screws 40 in the spaced legs of the clevis 37 bear at their inner ends against the lug 38 so as to properly adjust the rocker member 39. This member is provided with arms 41 and 42 which, when the rocker is rocked about the axis of the shaft 36, will effect the two-step ejection of the blank through the mechanism about to be described.

The arm 41 of the rocker member is engaged in an opening 43 of a slide 44 having a cam surface 45. This slide is slidably mounted in a portion 46 of the frame. The cam 45 of this slide member is adapted to engage the beveled or inclined edge 47 of the head 48 of a sleeve 49 slidably mounted in the portion 46 of the frame and engaged at its inner end with the plate 34. It will be obvious, therefore, that when the slide 44 is actuated, the sleeve 49 will be moved to the left, as shown in Fig. 1, thus moving the plate 34, pins 33 and die member 12 also to the left or forwardly with respect to the face of the die block.

Figure 2:
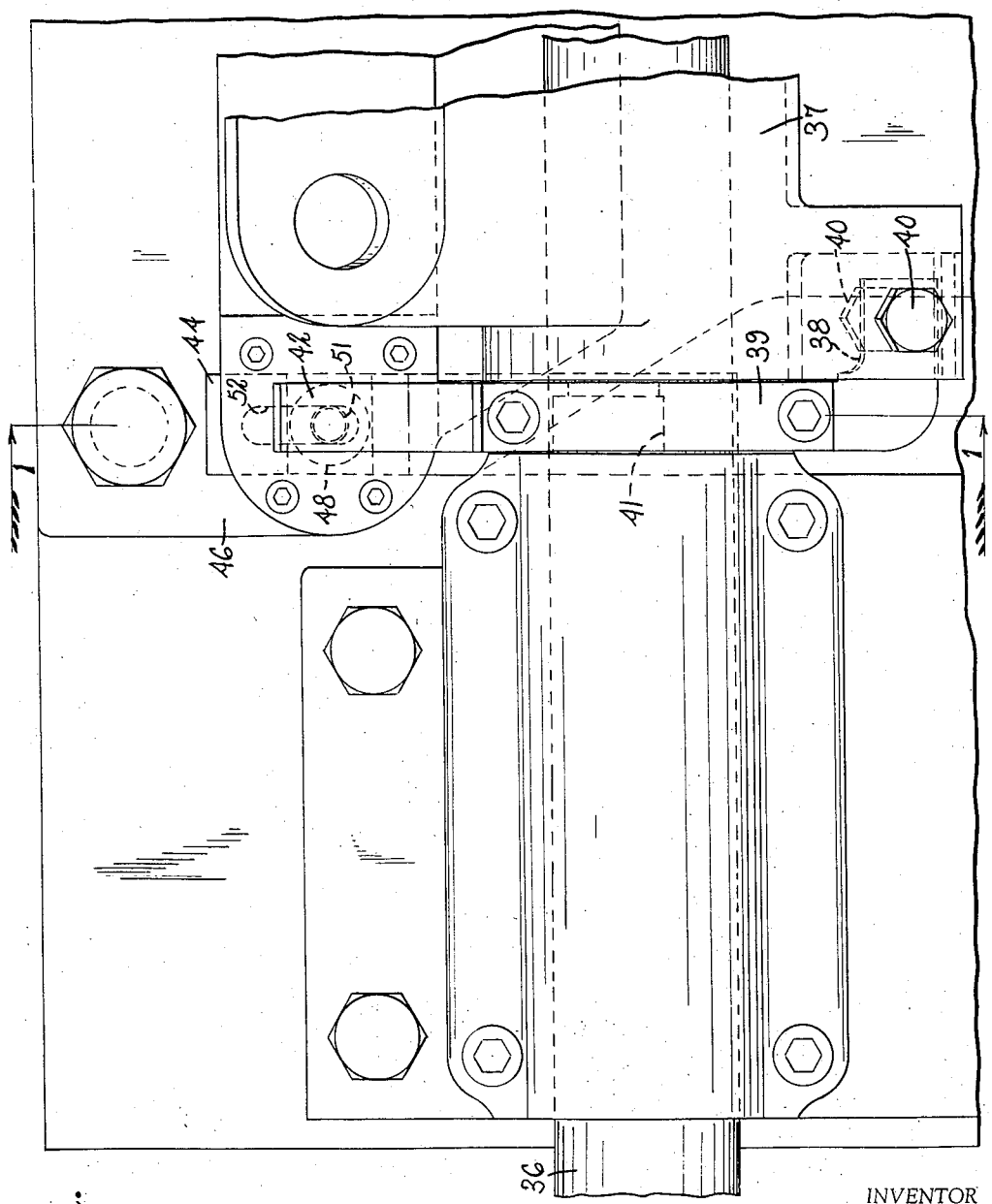
Fig. 2 is a rear elevational view of the blank-ejecting mechanism shown in Fig. 1.

As shown in full lines in Fig. 1, the front face of the arm 42 of the rocker 39 stands in spaced relation to the end of a pin 51 which pin extends through an opening 52 in the slide 44 and extends slidably through the sleeve 49 to be engaged at its inner end against the plate 31. This spaced relation of the front surface of the arm 42 and the adjacent end of the pin 51 permits a lost motion relationship between these parts. However, when the rocker 39 has been rocked through a sufficient angle the arm 42 will engage the pin 51 and move this pin to the left or forwardly, as shown in Fig. 1, thus moving the plate 31, the pins 30 and the ejecting or knock-out sleeve 25 in the same direction.

The operation of the parts is as follows. The position of the die 22 and associated parts at the end of a forming operation is shown in Figs. 1 and 7 wherein it will be noted that the die has been moved inwardly or rearwardly from its outermost position and the blank 23 embraces the tapered end of the forming punch 19, a part of the blank having been forced into the keyway 22 to provide a key upon the blank. The blank is bound tightly against the punch as well as being bound in the die, and a considerable effort is necessary to eject it.

When the punch 24 recedes or moves toward the left, as shown in Figs. 1 and 7, the shaft 36 is rocked in a counter-clockwise direction from the position shown in full lines in this figure.

Figure 5:
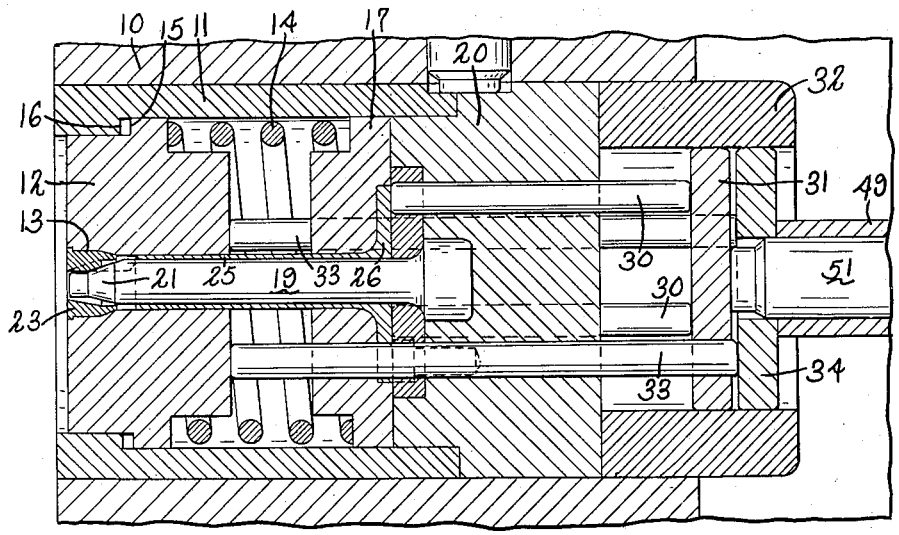
Fig. 5 is an enlarged sectional view through the die and associated parts showing the die in a forward position with respect to that shown in Fig. 1.

During the first part of this movement the pin 51 remains stationary but the slide 44 is moved downwardly and the cam surface 45 of this slide acts against the beveled or inclined edge 47 of the sleeve 49 and moves this sleeve forwardly for use at the plate 34 and pins 33 to the position shown in Figs. 5 and 8. In this position it will be seen that while the die 22 is not yet quite flush with the face of the die bed, the bond between the blank 23 and the forming pin 19 has been broken and the blank has advanced with the die in relation to this pin. Thus the bond between the blank and the pin is broken separately or separately from or prior to the breaking of the bond between the blank and die.

Figure 6:
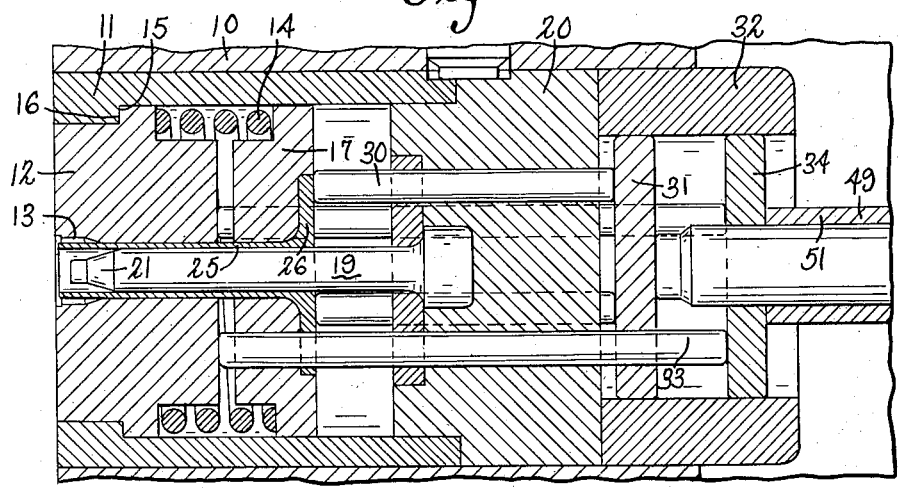
Fig. 6 is a view similar to Fig. 5 showing the die in its extreme forward position after the blank has been ejected therefrom.

Upon continued movement of the punch the sleeve 49 is further advanced to some extent to advance the die 22 to the position shown in Fig. 6 where its face is flush with that of the die bed. During this continued movement the arm 42 of the rocker 49 acts upon the pin 51 and advances the plate 31 and pins 30, thus moving the sleeve 25 forwardly to the position shown in Fig. 6. This breaks the bond between the blank and the die and ejects the blank from the die.

It will be obvious that with the above construction less effort is required at one time to eject the blank from the die than if the ejection were made in one step instead of two and the bonds between the blank and both pin and die were broken at the same time. Nevertheless the ejection action is effected by a single rocking movement of the shaft 36 and rocker 39 due to the fact that while this arm engages both slide 44 and pin 51 it has a lost-motion connection with the latter so that the pin 51 is not moved during the first part of the movement of the rocker 39 but is picked up during the latter part of this movement.

While I have shown and described a preferred embodiment of my invention, it will be understood that it is not to be limited to all of the details shown, but is capable of modification and variation within the spirit of the invention and within the scope of the claims.

What I claim is:

1. Means for ejecting a blank from a forming machine having a die bed and a sliding die therein provided with an opening within which the blank is formed and a forming pin fixed with respect to the bed and extending into the die opening, a rocker member rockably mounted on the machine, means for rocking said member and separate means actuated by said rocker member to first advance said die and blank relatively to the pin to break the bond between the pin and blank and to thereafter eject the blank from the die.

2. Means for ejecting a blank from a forming machine having a die bed and a sliding die therein provided with an opening within which the blank is formed and a forming pin fixed with respect to the bed and extending into the die opening, a sleeve surrounding said pin and adapted to extend into the die opening at its forward end, means for slidably mounting said sleeve, knock-out means slidably mounted in the die bed and engaging said die to advance it and the blank relatively to the pin, knock-out means acting on said sleeve to advance it relatively to the die, means for actuating both of said knock-out means, and a lost-motion connection between said actuating means and said knock-out means acting on said sleeve.

3. Means for ejecting a blank from a forming machine having a die bed and a sliding die therein provided with an opening within which the blank is formed and a forming pin fixed with respect to the bed and extending into the die opening, a sleeve surrounding said pin and adapted to extend into the die opening at its forward end, means for slidably mounting said sleeve, knock-out means slidably mounted in the die bed and engaging said die to advance it and the blank relatively to the pin, a second knock-out means acting on said sleeve to advance it relatively to the die, and a shaft rockably mounted in the machine, means for rocking said shaft, and means carried by said shaft for actuating one of said knock-out means and subsequently actuating the second knock-out means.

4. Means for ejecting a blank from a forming machine having a die bed and a sliding die therein provided with an opening within which the blank is formed and a forming pin fixed with respect to the bed and extending into the die opening, a sleeve surrounding said pin and adapted to extend into the die opening at its forward end, means for slidably mounting said sleeve, knock-out means engaging said die to advance it and the blank relatively to the pin, a second knock-out means acting on said sleeve to advance it relatively to the die, and means for actuating both of said knock-out means, said actuating means including an operatively mounted rockable member to actuate both said knock-out means, said member having a lost-motion connection with said second knock-out means.

5. Means for ejecting a blank from a forming machine having a die bed and a sliding die therein provided with an opening within which the blank is formed and a forming pin fixed with respect to the bed and extending into the die opening, a sleeve surrounding said pin and adapted to extend into the die opening at its forward end, means for slidably mounting said sleeve, a member slidably mounted in the die bed and engaged with said die, a second member slidably mounted in the die bed and engaged with said sleeve, a rockable member mounted on the machine, and means actuated by said rockable member to first engage said first slidable member in the die bed and advance the die and blank relatively to the forming pin and thereafter engage said second slidable member in the die bed and advance said sleeve relatively to the die to eject the blank from the die.

6. Means for ejecting a blank from a forming machine having a die bed and a sliding die therein provided with an opening within which the blank is formed and a forming pin fixed with respect to the bed and extending into the die opening, a sleeve surrounding said pin and adapted to extend into the die opening at its forward end, means for slidably mounting said sleeve, a first member slidably mounted on the die bed and engaged with said die, a second member slidably mounted on the die bed and engaged with said sleeve, relatively movable members mounted in the machine, one of which is engaged with said first member and the other is engaged with said second member, a single rockable member and means connecting said member to each of said relatively movable members to actuate them in sequence to first advance the die and blank relatively to the pin and thereafter advance said sleeve relatively to the die to eject the blank from the latter.

7. Means for ejecting a blank from a forming machine having a die bed and a sliding die therein provided with an opening within which the blank is formed and a forming pin fixed with respect to the bed and extending into the die opening, a sleeve surrounding said pin and adapted to extend into the die opening at its forward end, means for slidably mounting said sleeve, a first member slidably mounted on the die bed and engaged with said die, a second member slidably mounted on the die bed and engaged with said sleeve, relatively movable members mounted in the machine, one of which is engaged with said first member and the other is engaged with said second member, and a single rockable member to actuate each of said relatively movable members in sequence to first advance the die and blank relatively to the pin and thereafter advance said sleeve relatively to the die to eject the blank from the latter, said relatively movable members comprising a knock-out rod and a sleeve surrounding said rod, said sleeve actuating said first member which engages the die and said rod actuating said second member which actuates the sleeve surrounding the forming pin.

8. Means for ejecting a blank from a forming machine having a die bed and a sliding die therein provided with an opening within which the blank is formed and a forming pin fixed with respect to the bed and extending into the die opening, a sleeve surrounding said pin and adapted to extend into the die opening at its forward end, means for slidably mounting said sleeve, a first member slidably mounted on the die bed and engaged with said die, a second member slidably mounted on the die bed and engaged with said sleeve, relatively movable members mounted in the machine, one of which is engaged with said first member and the other is engaged with said second member, and a single rockable member to actuate each of said relatively movable members in sequence to first advance the die and blank relatively to the pin and thereafter advance said sleeve relatively to the die to eject the blank from the latter, said relatively movable members comprising a knock-out rod operatively engaged with said first member to actuate the same, and a second sleeve surrounding said rod and operatively connected to said second member to actuate the latter, a cam member to actuate said last-named sleeve, and said rockable member when moved first moving said second sleeve and thereafter engaging said knock-out rod.

9. Means for ejecting a blank from a forming machine having a die bed and a sliding die therein provided with an opening within which the blank is formed and a forming pin fixed with respect to the die bed and extending into the die opening, a sleeve surrounding said pin and adapted to extend into the die opening at its forward end, means for slidably mounting said sleeve, a member slidably mounted in the die bed and engaged with the die, a second member slidably mounted in the die bed and engaged with said sleeve, a rocker member rockably mounted on the machine, and means actuated by continuous movement of said rocker member in one direction to first engage said first slidable member and advance the die and blank relatively to the forming pin and thereafter engage said second slidable member in the die bed and advance the sleeve relatively to the die to eject the blank from the die.

10. Means for ejecting a blank from a forming machine having a die bed and a sliding die therein provided with an opening within which the blank is formed and a forming pin fixed with respect to the die bed and extending into the die opening, a sleeve surrounding said pin and adapted to extend into the die opening at its forward end, means for slidably mounting said sleeve, a member slidably mounted in the die bed and engaged with the die, a second member slidably mounted in the die bed and engaged with said sleeve, a rocker member rockably mounted on the machine, means actuated by an initial movement of said rocker member in one direction to move said first slidable member and advance the die and blank relatively to the pin and by a further movement of the rocker member in the same direction to engage said second slidable member and advance said sleeve to eject the blank from the die.

11. Means for ejecting a blank from a forming machine having a die bed and a sliding die therein provided with an opening within which the blank is formed, a spring urging said die forwardly in the bed, a forming pin fixed with respect to the bed and extending into the die opening, a sleeve surrounding said pin and adapted to extend into the die opening at its forward end, means for slidably mounting said sleeve for movement with respect to the pin, an ejecting pin slidably mounted in the die bed the outer end of which engages said die, means to advance the ejecting pin to advance the die and blank relatively to the forming pin and break the bond between the blank and the latter, and means to thereafter advance said sleeve to eject the blank from the die.

References Cited in the file of this patent
UNITED STATES PATENTS

| | | |
|---|---|---|
| 1,900,572 | Lyman | Mar. 7, 1933 |
| 2,041,939 | Kuhne | May 26, 1936 |
| 2,207,391 | Wilcox | July 9, 1940 |